United States Patent [19]

Zimek

[11] Patent Number: 5,429,469
[45] Date of Patent: Jul. 4, 1995

[54] LOAD UNITS TRANS-LOADING INSTALLATION

[75] Inventor: Dieter Zimek, Essen, Germany

[73] Assignee: Krupp Industrietechnik Gesellschaft mit Beschrankter Haftung, Duisburg, Germany

[21] Appl. No.: 339,579

[22] Filed: Nov. 14, 1994

Related U.S. Application Data

[63] Continuation of Ser. No. 977,433, filed as PCT/EP92/01339, Jun. 13, 1991, abandoned.

[30] Foreign Application Priority Data

Jun. 25, 1991 [DE] Germany .............. 41 20 923.0

[51] Int. Cl.⁶ ............................................. B65G 1/04
[52] U.S. Cl. .................................. 414/277; 414/392; 414/399
[58] Field of Search ............... 414/340, 390, 391, 392, 414/399, 277, 282, 283; 212/281

[56] References Cited

U.S. PATENT DOCUMENTS

| | | | |
|---|---|---|---|
| 3,536,209 | 10/1970 | Burch | 414/277 |
| 3,559,822 | 2/1971 | Lichtenford et al. | 414/140.3 |
| 4,027,823 | 6/1977 | Kawarai et al. | 414/392 |
| 4,435,118 | 3/1984 | Behrend et al. | 212/190 |
| 4,538,950 | 9/1985 | Shiomi et al. | 414/392 |
| 4,850,783 | 7/1989 | Maekawa | 414/392 |
| 5,096,355 | 3/1992 | Schroder | 414/277 |
| 5,176,485 | 1/1993 | Ruder et al. | 414/392 |

FOREIGN PATENT DOCUMENTS 1556043 9/1969 Germany .
2506450 8/1976 Germany .

OTHER PUBLICATIONS

Fordern und Heben, vol. 40, No. 8, Aug. 1990, pp. 543–544.

Primary Examiner—Michael S. Huppert
Assistant Examiner—Thomas J. Brahan
Attorney, Agent, or Firm—Herbert Dubno

[57] ABSTRACT

Installations for trans-loading piece goods in the form of load units (3) such as containers, returnable vessels, semi-trailers or the like between road and railborne vehicles (2) comprise a single or multiple storey store (5, 6) for the load units (3) on one side of a single or multiple track railway line (1), a single or multiple lane roadway (9) on the other side of the store (5, 6) as well as lifting gear means (10, 11) for transferring the load units (3). In order to reduce the required floor area for simplifying the lifting gear means to be employed as well as accelerating the transfer, the store (5, 6) in such an installation is to be divided longitudinally into two parts with an operating space (7) accommodated between the store portions (5, 6) and having fixed to the four corners of the operating space (7) one load lifting gear means (11) each. The width of the operating space (7) corresponds at least to the length of the largest load unit which is to be transferred. In the operating space (7) a store lifting means (10) is movable which services the store parts. The load lifting gear means (11) have an operating radius of at least three quarters the length of the largest load unit and serve for loading and unloading the vehicles (2), in particular whilst travelling past at reduced velocity.

10 Claims, 2 Drawing Sheets

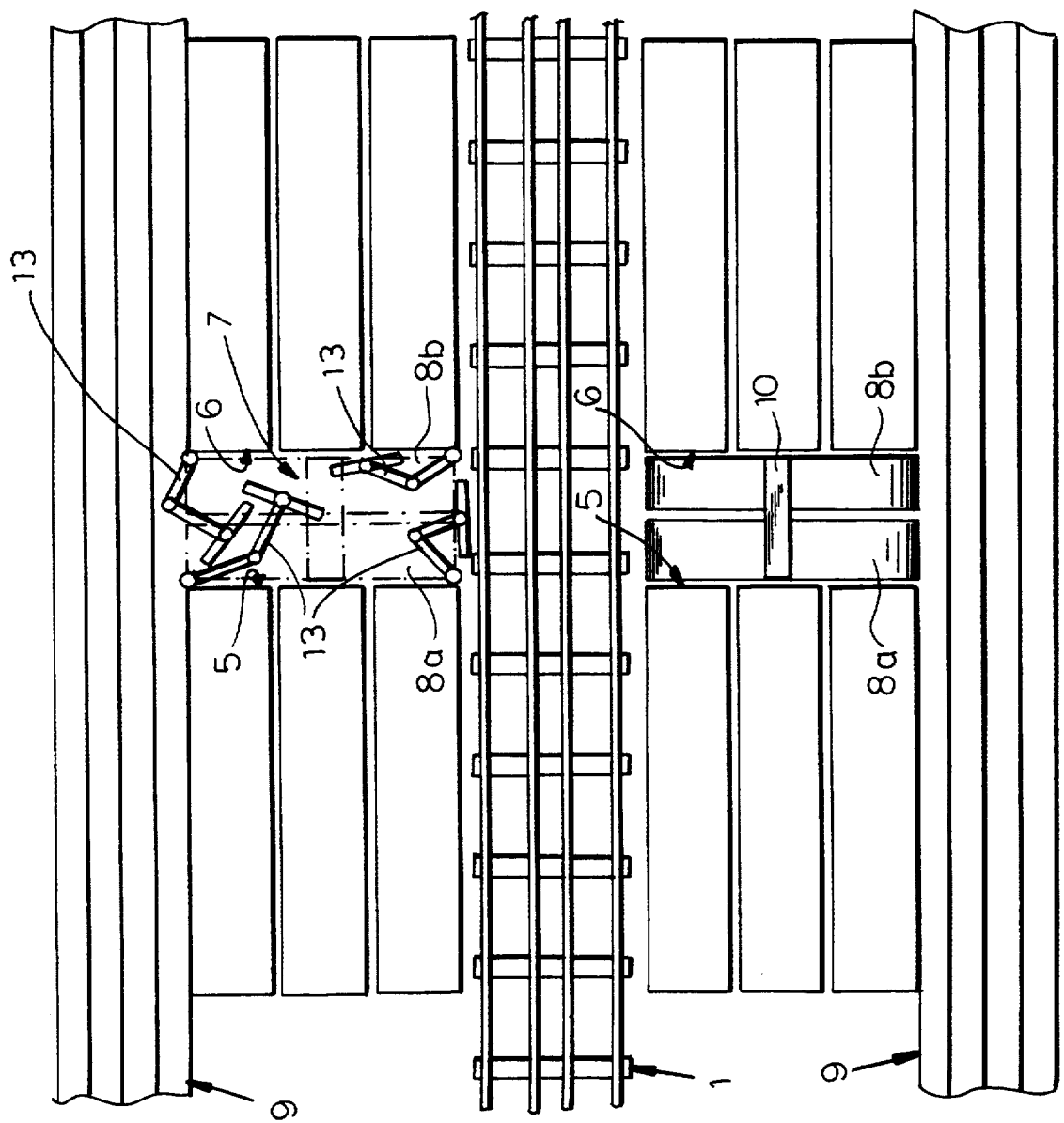

LOAD UNITS TRANS-LOADING INSTALLATION

This is a continuation of application Ser. No. 07/977,433, filed as PCT/EP92/01339, Jun. 13, 1991, now abandoned.

CROSS REFERENCE TO RELATED APPLICATIONS

This application is a national phase of PCT/EP92/01339 filed 13 Jun. 1992 and based, in turn, on German national application P 41 20 923.0 of 25 Jun. 1991 under the International Convention.

1. Field of the Invention

The invention relates to an installation for trans-loading load units such as containers, returnable containers, semi-trailers or the like between road and railborne vehicles comprising a single or multiple storey store for the load units on one side of a single or multiple track railway line, further comprising a single or multiple lane road traffic way on the other side of the store as well as lifting equipment for transposing the load units.

2. Background of the Invention

In known transloading equipment extensive floor areas are required. They are equipped usually with a major number of expensive lifting apparatuses means for trans-placing the load units and permit only the loading and unloading of stationary vehicles. The transloading proceeds relatively slowly. Cranes described for certain cases wherein such cranes travel with the vehicle to be unloaded or loaded, require a long distance for travelling alongside and are suitable only to a limited extent for goods trans-loading.

3. Object of the Invention

It is an object of the present invention to remove these disadvantages and to provide a load unit transloading means which operates substantially more efficiently.

SUMMARY OF THE INVENTION

According to the invention the store is divided longitudinally in two, and the installation comprises an operating space having at least a length corresponding to the width of the largest load unit between the two store portions, inside which a store lifting means, servicing the store portions, is movable and that at each of the four corners of the operating space a respective load lifting means is permanently fitted, having an operating radius of at least three quarter the length of the largest load unit, for loading and unloading the vehicles, in particular while they travel past at a reduced velocity, and, when desired or required, for storing the load units in the store. This arrangement permits a very rapid discontinuous or continuous unloading or loading, e.g. of container trains, i.e. with the train passing slowly.

In a discontinuous operation that particular train section which is reachable by one of the load lifting means is unloaded or loaded at any one time and subsequently the train is moved forward by the length of such section.

In a continuous operation the travelling velocity of the train and the velocity at which the lifting tools carry out the unloading or loading are matched to one another. The load lifting tools move the load units which may be of optional dimensions and can be readily be dealt with in mixed batches, at any one time between the vehicle and the operating space, or even the store directly.

For moving the load units between the operating space and the store the store lifting device is provided which, depending on circumstances, operates in conjunction with the load lifting devices and is attuned to the movement thereof during the unloading or loading operation so that no congestion of load units arises in the operating space. During unloading of a train the load units are passed by the store lifting gear from the operating space either into the store or directly to the operating region of the load lifting means associated with the roadway for loading the road vehicles. Accordingly, in the most favorable case an unloading rate is attainable which is determined by the time required for the simultaneous transferring of two load units by the two load lifting gear units associated with the railway line based on the train length associated with those two load units.

The space requirement of the entire installation can then be very small and will practically be determined only by the operating space and the buffer volume which is used to the extent that a direct load transfer of load units from the one traffic facility to the other does not take place nor can be expected.

The store lifting gear advantageously takes the form of a lifting structure, adapted to travel in the operating space transversely to the traffic ways, including a for example spreaderlike gripper for the load units and a transfer means for entering the compartments of the store and withdrawing the load units therefrom. Such a lifting gear can be designed in a simple and operationally safe manner and permits a rapid transfer of load units between the operating space and the store even in multiple storey store designs.

In accordance with a further development of the invention the load lifting gear is a pivoting gripper having two swinging arms pivotally linked to one another, the outermost of which carries a gripper, e.g. of a spreader type, at its free end. This design of the load lifting gear in conjunction with its stationary mounting is very cost effective and reliable and permits an easy incorporation in an automatized or computer supported control for a high operating rate.

For further simplification of the construction and increasing the operational reliability pivoting pillar can be provided between the mounting of the swinging gripper and the inner swinging arm, including a lifting means. The lifting means advantageously comprises a differential cylinder.

In addition it is recommended to so dimension the length of the inner swinging arm that the linkage between the inner and the outer swinging arms in all operating positions remains outside the center of the nearest lane of the respective traffic way. This in conjunction with an otherwise unrestricted dimensioning and positioning of the innermost swinging arm permits, for example in the case of a railway line powered from a contact wire, to carry out the load transfer underneath the contact wire for as long as the outermost swinging arm is appropriately designed and positioned.

The load lifting gear may also take the form of a telescope gripper, including a telescopically extendible, horizontally and vertically pivotal carrier beam which at its free end bears a gripper, which may for example be of the spreader type. Such a telescope gripper can be compared to a telescope jib for vehicle cranes except that it comprises a joggle linkage at its top. A very high transfer rate can be attained therewith due to the ability for telescopic, vertical and horizontal swivelling movements to be superimposed during the transferring of load units.

In a particularly advantageous embodiment of the invention the two load lifting gear means on any one store side are so designed and so interact that they jointly move a load unit, in particular in order to pivot by up to 180° about their vertical central axis. In this manner the load lifting means can be designed particularly easily since in appropriate cases they need merely be designed each for safety handling one load unit of half the size of the largest load unit to be processed with a slight prolonging of the transfer period, if for the larger load units, both load lifting means are used for a single load unit.

According to a further feature of the invention a horizontal, longitudinal conveyor, which in the longitudinal direction is in one or more pieces, is provided between the railway line and the store. For further acceleration of the transfer procedure an intermediate deposition and/or presorting of the load units unloaded from the train or to be loaded onto it may be carded out on such a conveyor outside of the operating space.

Independently thereof a horizontal, transverse conveyor extending transversely to the traffic ways, is provided advantageously in the operating space. On such conveyor which forms the floor of the operating space it is likewise possible to carry out sorting of the load units. It thus serves to provide relief for the store lifting gear but may, in addition, be employed for the direct transportation of the load units from one traffic way to the other without intermediate storage and accordingly assumes at least partly the tasks of the store lifting gear so that the transfer rate is further increased.

This also applies to a modification of this proposal in accordance with which the horizontal transverse conveyor in its transverse direction is divided into two parts each of which is associated with one store portion for the separate, simultaneous unloading by way of the one store portion and loading by way of the other store portion. With this arrangement it is possible to simultaneously unload and load a train both in the event of discontinuous as well as continuous processing. The processing by way of the one or the other store portion thus also includes the direct load transfer by way of the respective part of the horizontal, transverse conveyor to respectively from the road. In the case of large load units both parts are so operated that in that case conveyance proceeds in one direction only. In addition the horizontal, transverse conveyor can be so designed that for heavy load units the lowermost plane of the store can be serviced if desired or required directly by way of special transfer means. This obviates the need of dimensioning the lifting capacity of store lifting gear to the requirements of these load units.

It is advantageous to associate the railway line with a traction/pushing apparatus for the mutual matching of the passing-by travelling velocity of the railborne vehicles and the loading or unloading rate of the load lifting gear means. This installation which obviously can also be employed in the discontinuous processing of trains can comprise a rope drive and an auxiliary carriage acting on the last pair of bumpers. It permits an accurate setting of the velocity and the switching off, the dispensing with or removal of the contact wire or any other train driving power supply during loading.

In order to fully utilize the processing capacity of a store for a loading procedure in synchronisation with the other loading procedure it is proposed in accordance with the invention to provide two stores, each in two parts longitudinally one behind the other and with an intermediate vehicle processing zone in which any possibly required re-equipment of the vehicles, even if manual, takes place between unloading and loading. This permits, both in the event of discontinuous as well as continuous processing of a train, to perform the unloading and—merely staggered in time by the processing of the train length between the two operating spaces, i.e. essentially simultaneously—also the reloading in a single passage. To the extent necessary the vehicles in the vehicle treatment zone are brought manually or by appropriate auxiliary means, into a suitable condition for loading with load units differing from the preceding ones.

For a further substantial acceleration of the load transfer the aforedescribed store facilities are provided in mirror image fashion on both sides of the railway line. In the event of multiple track railway lines it is thus possible to simultaneously, and in any event mutually independently, treat two trains. For the processing of one train on one track, even if further unoccupied tracks are left available, it is advisable to longitudinally stagger the two mirror image-like store facilities in relation to one another, appropriately by the length of one train section which can be reached by the two load lifting gear means of one operating space and associated with the railway line, in order to avoid overlapping processing. In this context care needs to be taken that the operating radius of the load lifting gear means on both sides is adequately large.

As for the remainder it is proposed that the entire installation is completely or substantially enclosed in order to protect the environment against emissions, in particular of noise and the installations against undesirable weathering influences. The trans-loading region including the operating space or the horizontal transverse conveyor, the horizontal longitudinal conveyor and optionally the traffic ways, because of its relatively small surface area can be equipped at relatively modest costs with bottom troughs which serve for soil and ground water protection. In the longitudinal direction of the traffic ways in front of and behind the load transfer installation it is possible to provide regions and equipment for identifying and measuring the load units.

BRIEF DESCRIPTION OF THE DRAWING

The above and other objects, features, and advantages will become more readily apparent from the following description, reference being made to the accompanying drawing in which:

FIG. 2 is a plan view of an apparatus embodying the equipment of FIG. 1 but showing other features as well.

SPECIFIC DESCRIPTION

Figure 1:
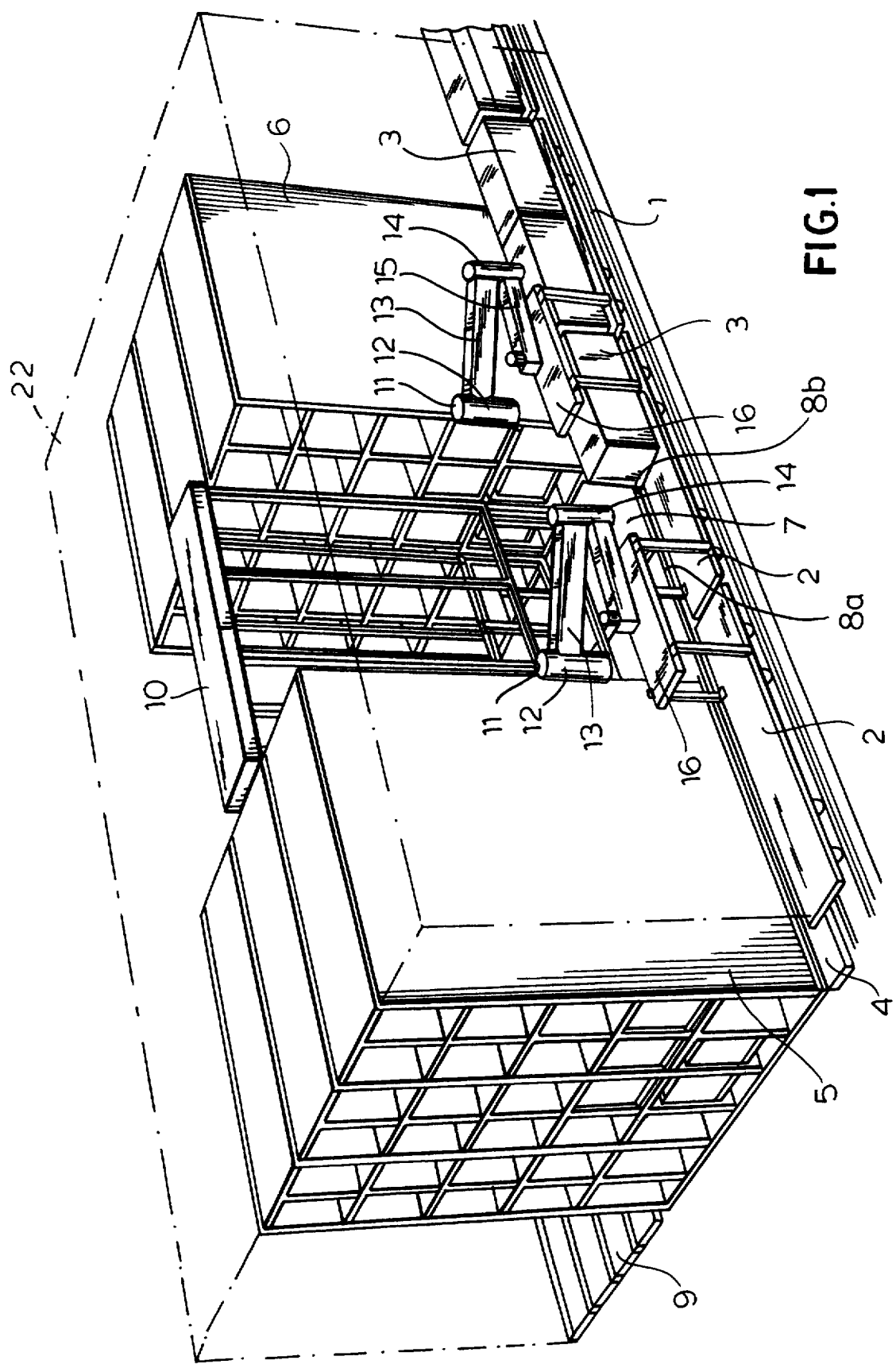
FIG. 1 is a perspective view of a load transfer apparatus according to the invention in highly diagrammatic form.

On a railway line 1 (FIG. 1) railborne vehicles 2 of a container train. These vehicles 2 are loaded with load units 3 in the form of containers. On one side of the railway line 1 which in this case is shown to be of single track design and immediately alongside thereof a horizontal longitudinal conveyor 4 is provided as well as a five storey high store composed of two store portions 5 and 6 and an operating space 7 therebetween in which a horizontal transverse conveyor 8, divided into two sections 8a and 8b, is accommodated. On the one side of the store 5, 6 which is opposite to the railway line 1—parallel to the railway line 1—a roadway 9, which in this case has four lanes, is provided on which road vehicles, e.g. trucks, likewise with trailers for container transport or with separately operable semi-trailers, pass the operating space 7. In the operating space 7 a lifting structure 10 is movably provided serving as a store lifting unit between the traffic ways 1 and 9. It is equipped with a spreaderlike gripper on a crossbar in such a manner that load units can be picked up and set down in the operating space 7 in optional positions. Furthermore transfer installations are provided, likewise not illustrated, which, for example in collaboration between the lifting structure 10 and corresponding equipment in the store passages, permit an introduction and withdrawal of load units 3 from the lifting structure 10 into respectively out of the store 5, 6. Swinging grippers 11 serving as load lifting gear are fitted to the corners of the operating space 7. A pivoting column 12 with integrated lifting means carries an inner swinging arm 13 to which by way of a linkage 14 and outer swinging arm 15 is pivoted. A spreaderlike gripper 16 which permits gripping the load units 3 and transporting them between the vehicles 2 and the operating space 7, respectively also the depositing positions which it can reach in the store portions 4 or 5, is fitted pivotally about a vertical axis to the free end of the swinging arm 15. The picking up of two smaller load units simultaneously by one gripper or of one larger load units by two grippers simultaneously is likewise provided for.

FIG. 2 shows all four of the load lifting units 31 one at each corner of the operating space 7 between two of the stores 5, 6. As is also apparent, the stores 5, 6, 21 have a mirror arrangement on both sides of the railway line 1. An enclosure for the installation has been represented at 22 in FIG. 1.

I claim:

1. An apparatus for transloading load units including freight containers between road and rail borne vehicles, comprising:
   a railway line;
   railborne vehicles displaceable along said railway line;
   a store for said load units disposed along one side of said railway line and including two compartmented store sections spaced apart along said railway line by at least a length corresponding to a largest load unit handled by said apparatus thereby defining an operating space between said sections, said operating space extending transversely to said railway line;
   store lifting means displaceable along said operating space for transporting load units to and from compartments of said section and said operating space;
   a roadway disposed alongside said store on a side thereof opposite said railway line, said operating space having four corners where said operating space adjacent said sections terminates at said railway line and said roadway; and
   at each of said four corners of said operating space a respective load lifting device having an operating radius at least three quarters of a length of said largest load unit for loading and unloading said vehicle and storing said load in said store.

2. The apparatus defined in claim 1 wherein said store lifting means has a lifting structure including a spreader gripper for said load units movable in said operating space transversely to said railway line and said roadway.

3. The apparatus defined in claim 1 wherein each of said load lifting devices is a pivoting gripper having two swinging arms pivotally linked to one another, an outermost one of said arms being provided with a spreader gripper at a free end thereof.

4. The apparatus defined in claim 3 wherein a pivot is provided between an innermost arm of each pivoting gripper and a mounting thereof.

5. The apparatus defined in claim 4 wherein said innermost arm has a length dimensioned so that a linkage between the innermost and outermost arms remains outside a center of the nearest lane of said railway line and said roadway, respectively, in all operating positions of the respective load lifting device.

6. The apparatus defined in claim 1 wherein each of said load lifting devices includes a telescope gripper having a telescopically extendable horizontally and vertically pivotable carrier being bearing a spreader gripper at a free end thereof.

7. The apparatus defined in claim 1 wherein said load lifting devices are dimensioned and positioned for jointly moving a single load unit.

8. The apparatus defined in claim 1 further comprising between the railway line and the store, a horizontal longitudinal conveyor.

9. The apparatus defined in claim 1 wherein there is a mirror symmetrical arrangement of stores on both sides of the railway line.

10. The apparatus defined in claim 1 further comprising an enclosure for said store and said railway line.

* * * * *